(12) United States Patent
Wang et al.

(10) Patent No.: US 11,314,343 B2
(45) Date of Patent: Apr. 26, 2022

(54) TOUCH PAD STRUCTURE

(71) Applicant: Acer Incorporated, New Taipei (TW)

(72) Inventors: Yu-Shih Wang, New Taipei (TW);
Wen-Chieh Tai, New Taipei (TW);
Cheng-Nan Ling, New Taipei (TW);
Chih-Chun Liu, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/148,598

(22) Filed: Jan. 14, 2021

(65) Prior Publication Data
US 2021/0333898 A1    Oct. 28, 2021

(30) Foreign Application Priority Data

Apr. 24, 2020   (TW) ................................ 109113791

(51) Int. Cl.
*G06F 3/041*    (2006.01)
*G06F 3/0354*   (2013.01)

(52) U.S. Cl.
CPC ................................ *G06F 3/03547* (2013.01)

(58) Field of Classification Search
CPC ..... G06F 3/0354; G06F 3/03547; G06F 3/041
See application file for complete search history.

(56) References Cited

U.S. PATENT DOCUMENTS

| | | | | |
|---|---|---|---|---|
| 9,536,683 B2* | 1/2017 | Ho | ............................ | H01H 3/12 |
| 2010/0103611 A1* | 4/2010 | Yang | ........................ | G06F 1/169 |
| | | | | 361/679.55 |
| 2010/0302153 A1* | 12/2010 | Jung | .................... | G06F 3/03547 |
| | | | | 345/158 |
| 2011/0254786 A1* | 10/2011 | Wen | ....................... | G06F 3/0338 |
| | | | | 345/173 |
| 2011/0255242 A1* | 10/2011 | Shao | ................... | G06F 3/03548 |
| | | | | 361/679.55 |
| 2015/0008113 A1* | 1/2015 | Liu | ......................... | H01H 13/14 |
| | | | | 200/515 |
| 2015/0049427 A1* | 2/2015 | Lai | ......................... | G06F 1/1616 |
| | | | | 361/679.27 |
| 2015/0160750 A1* | 6/2015 | Wu | .......................... | G06F 3/041 |
| | | | | 345/173 |
| 2015/0169005 A1* | 6/2015 | Yanagida | ............ | G06F 3/03547 |
| | | | | 345/173 |
| 2021/0011565 A1* | 1/2021 | Pai | ...................... | G06F 3/03547 |
| 2021/0151267 A1* | 5/2021 | Pai | ...................... | G06F 3/03547 |

* cited by examiner

*Primary Examiner* — Joe H Cheng
(74) *Attorney, Agent, or Firm* — JCIPRNET

(57) ABSTRACT

A touch pad structure includes a touch module, a first bracket, a second bracket, and a plurality of linkage rods. The first bracket has a plurality of first pivoting portions, and the touch module is disposed on the first bracket. The second bracket has a plurality of second pivoting portions. Each of the linkage rods is pivotally connected between the first pivoting portion and the second pivoting portion, so that the touch module is moved together with the first bracket when the touch module is pressed. One portion of each of the linkage rods is pivotally rotated at the first pivoting portion, and another portion of each of the linkage rods is pivotally rotated and moved at the second pivoting portion, so that the touch module and the first bracket are moved toward a plane where the second bracket is located.

10 Claims, 4 Drawing Sheets

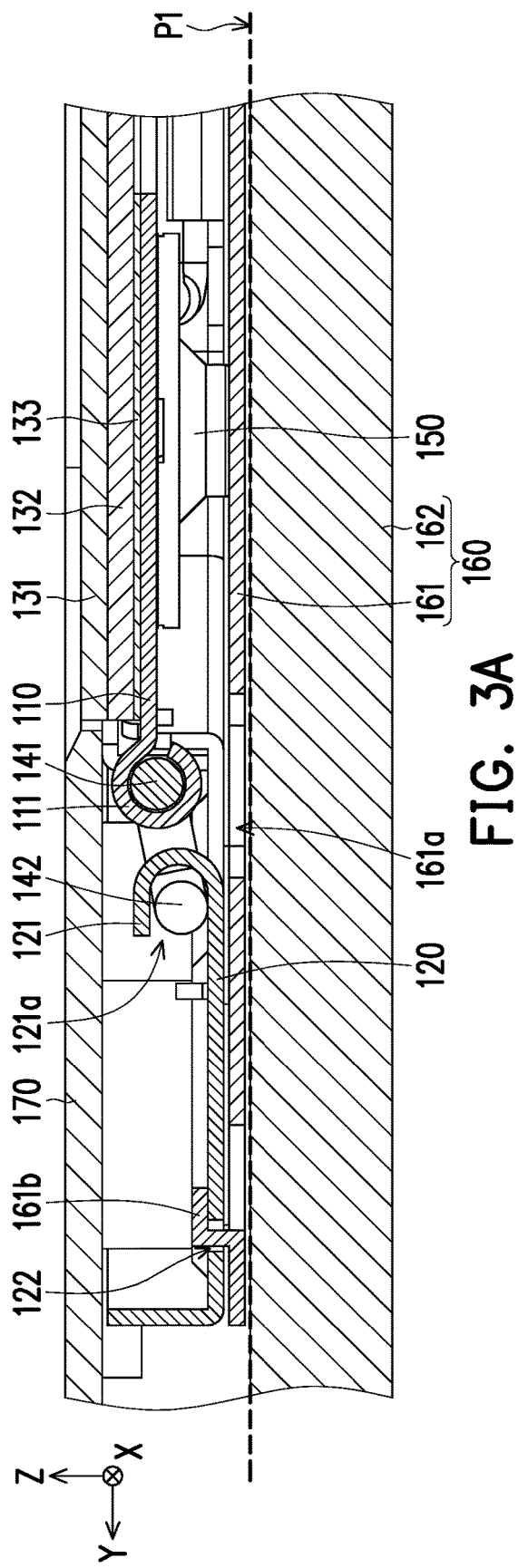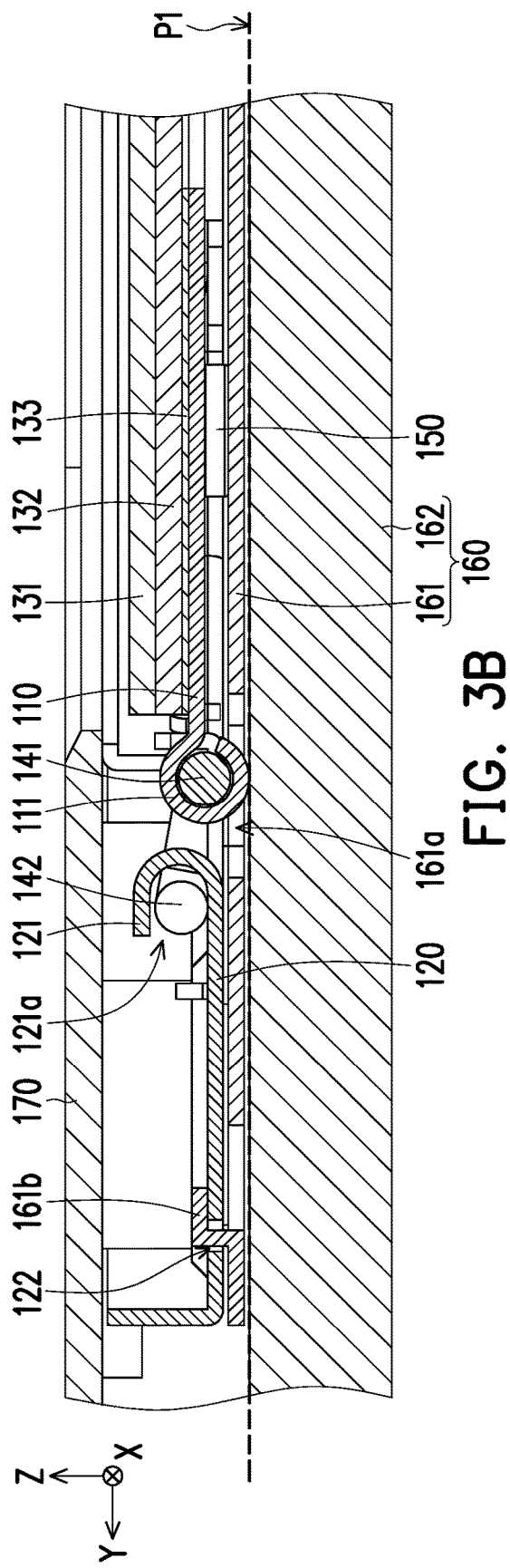

TOUCH PAD STRUCTURE

CROSS-REFERENCE TO RELATED APPLICATION

This application claims the priority benefit of Taiwan patent application serial no. 109113791, filed on Apr. 24, 2020. The entirety of the above-mentioned patent application is hereby incorporated by reference here and made a part of this specification.

BACKGROUND

Technical Field

The disclosure relates to a touch pad structure.

Description of Related Art

Vigorous development of electronic devices has facilitated human lives, and thus how to operate the electronic devices in a more user-friendly manner is an important issue. For instance, common electronic devices in our daily lives include notebook computers, mobile phones, satellite navigation devices, and so on. In order to operate the electronic devices efficiently, touch pads acting as input devices has been widely adopted to control the electronic devices.

Generally, a pressing point of a user on the touch pad does not stay unchanged, and different pressing points not only bring different pressing feelings to the user but also affect motion stability of the touch pad. Therefore, how to improve the pressing feeling when the user operates the touch pad and improve motion stability of the touch pad has drawn more and more attention. At the same time, how to maintain the pressing feeling in the design trend of miniaturizing bodies of the electronic devices in response to the requirements for compactness and light weight of the electronic devices has become a research and development project to which relevant manufacturers are dedicated.

SUMMARY

The disclosure provides a touch pad structure, and the full field of the touch pad structure can be pressed.

According to an embodiment of the disclosure, a touch pad structure includes a touch module, a first bracket, a second bracket, and a plurality of linkage rods. The first bracket has a plurality of first pivoting portions, and the touch module is disposed on the first bracket. The second bracket has a plurality of second pivoting portions. Each of the linkage rods is pivotally connected between the first pivoting portion and the second pivoting portion, so that the touch module is moved together with the first bracket when the touch module is pressed. One portion of each of the linkage rods is pivotally rotated at the first pivoting portion, and another portion of each of the linkage rods is pivotally rotated and moved at the second pivoting portion, so that the touch module and the first bracket are moved toward a plane where the second bracket is located.

Based on the above, in the touch pad structure provided in one or more embodiments of the disclosure, the touch module is disposed on the first bracket, and the linkage rods are connected between the first bracket and the second bracket, so that one portion of each of the linkage rods connected to the first pivoting portion is pivotally rotated, and another portion of each of the linkage rods connected to the second pivoting portion is pivotally rotated and moved, whereby the first bracket may be moved toward the plane where the second bracket is located when the touch module is pressed. In other words, no matter which portion of the touch module is pressed by the user, the touch module and the first bracket may be smoothly moved relative to the second bracket in the above-mentioned manner due to the connection relationship of the linkage rods.

As such, it is unlikely for the touch pad structure not to receive an average force due to its driving structure. At the same time, the simple mechanism composed of the first bracket, the second bracket, and the linkage rods may effectively reduce the thickness of the touch pad structure, so as to comply with the requirements for stable driving, light weight, and compactness.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein

FIG. 3A is a cross-sectional view of a portion of the touch pad structure in FIG. 1 along a sectional line A-A.

FIG. 3B is a cross-sectional view of a portion of the touch pad structure in FIG. 3A in another state.

DESCRIPTION OF THE EMBODIMENTS

Figure 1:
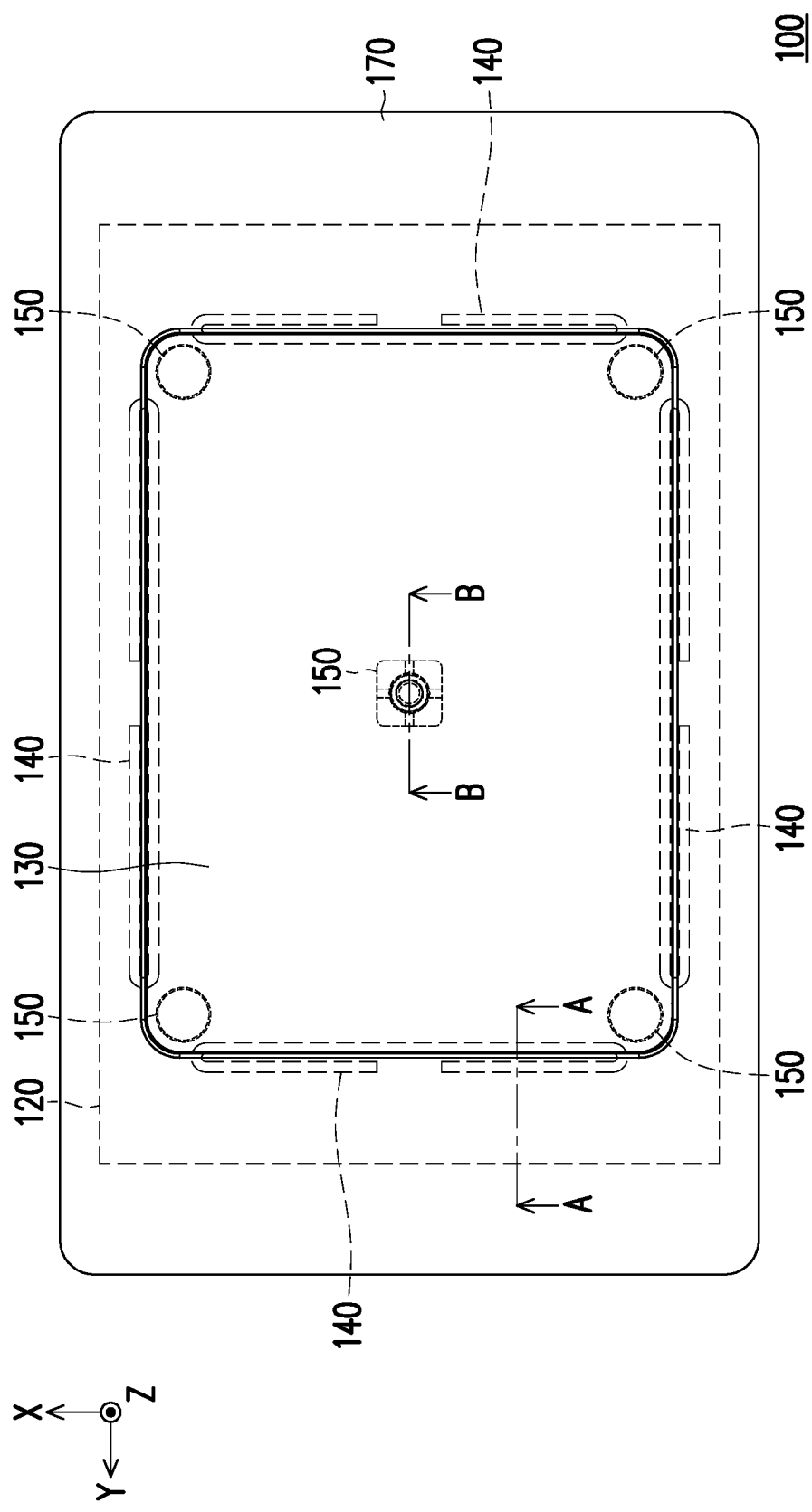
FIG. 1 is a top view of a touch pad structure according to an embodiment of the disclosure.
Figure 2:
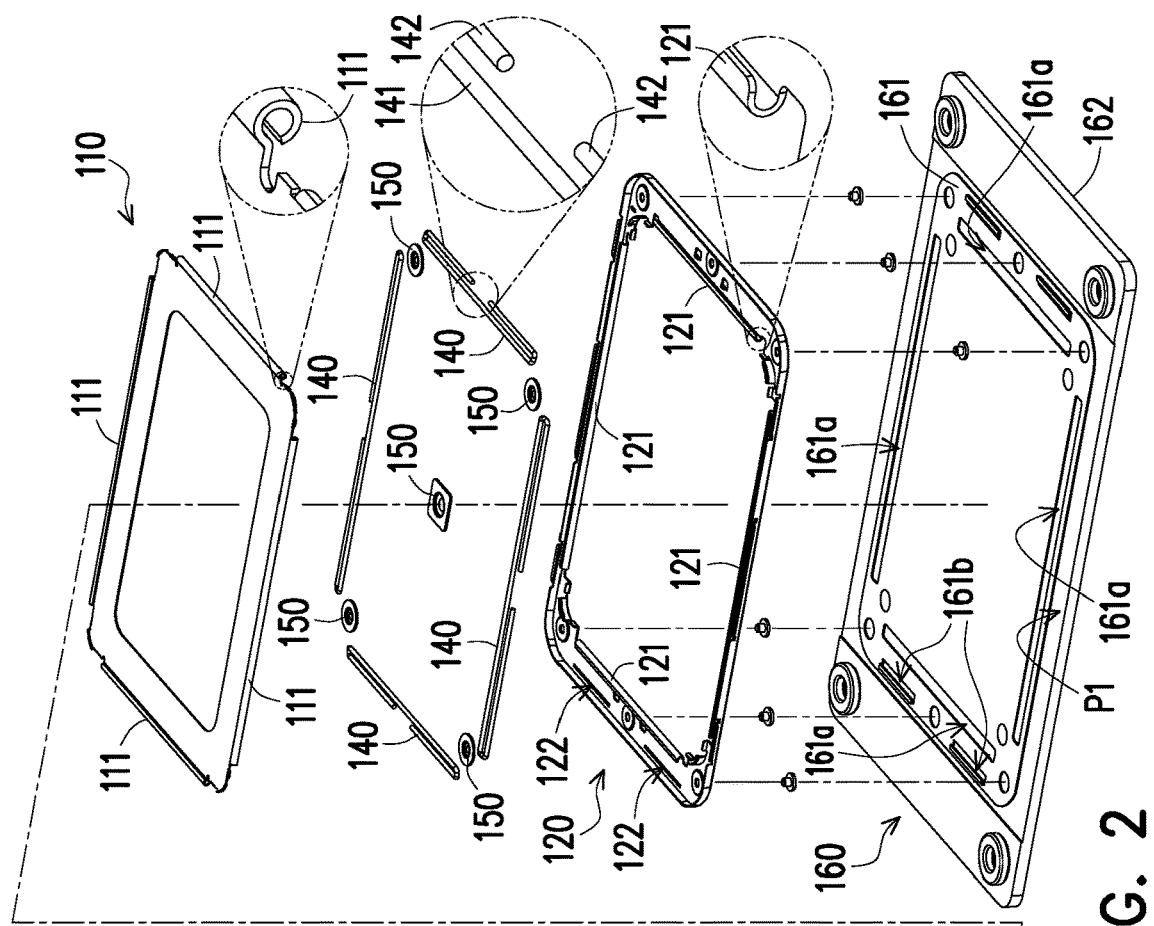
FIG. 2 is an exploded view of the touch pad structure in FIG. 1.
Figure 2:
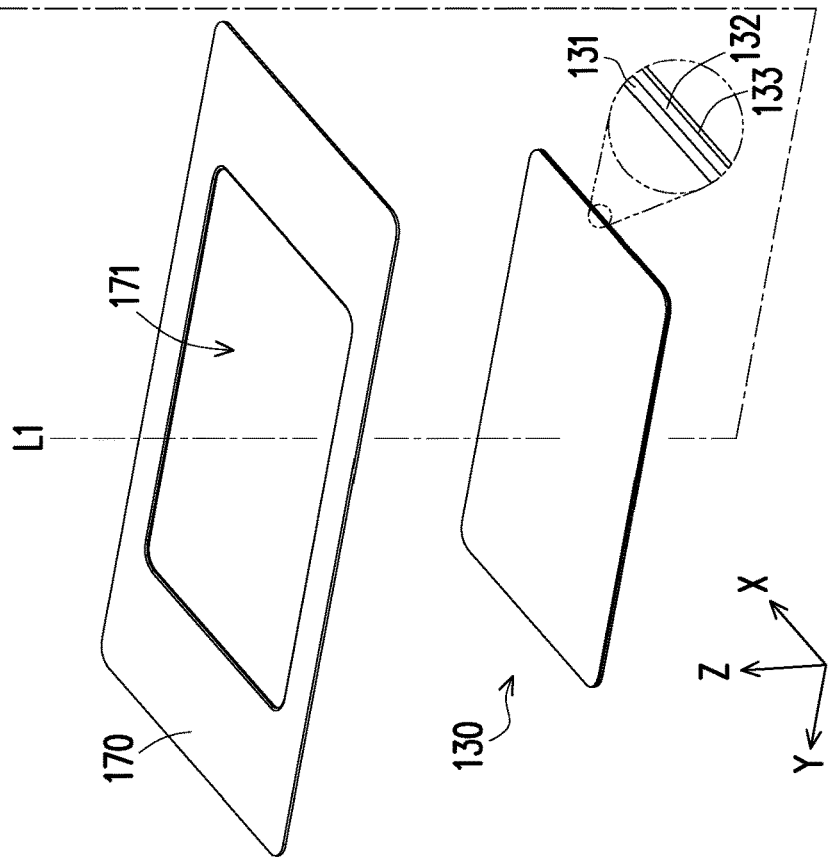

FIG. 1 is a top view of a touch pad structure according to an embodiment of the disclosure. FIG. 2 is an exploded view of the touch pad structure in FIG. 1. Here, rectangular coordinates X-Y-Z are provided to facilitate descriptions of components. With reference to FIG. 1 and FIG. 2 at the same time, in the embodiment, a touch pad structure 100 includes a touch module 130, a first bracket 110, a second bracket 120, and a plurality of linkage rods 140. The first bracket 110 has a plurality of first pivoting portions 111, and the touch module 130 is disposed on the first bracket 110. The second bracket 120 has a plurality of second pivoting portions 121. Each of the linkage rods 140 is pivotally connected between the first pivoting portion 111 and the second pivoting portion 121, so that the touch module 130 is moved together with the first bracket 110 when the touch module 130 is pressed. One portion of each of the linkage rods 140 is pivotally rotated at the first pivoting portion 111, and another portion of each of the linkage rods 140 is pivotally rotated and moved at the second pivoting portion 121, so that the first bracket 110 and the touch module 130 on the first bracket 110 are moved toward the second bracket 120.

Here, relevant features of the touch pad structure 100 adapted to a notebook computer are depicted in the embodiment, which should however not be construed as a limitation in the disclosure; that is, the touch pad structure 100 may be substantially adapted to any electronic device whose operation requires a touch pad.

FIG. 3A is a cross-sectional view of a portion of the touch pad structure in FIG. 1 along a sectional line A-A. With reference to FIG. 1, FIG. 2, and FIG. 3A at the same time, specifically, the touch pad structure 100 further includes an upper cover 170 and a base 160, wherein the base 160 is formed by placing a supporting plate 161 on a bottom board 162. The second bracket 120 is disposed on the support plate 161, and after the first bracket 110, the linkage rods 140, and the touch module 130 are completely assembled and arranged, the upper cover 170 is assembled to the base 160, and the touch module 130 is exposed by an opening 171 of the upper cover 170.

Furthermore, the first bracket 110 and the second bracket 120 form a stacked frame body with the same central axis L1, which is shown in FIG. 3A on the condition that the touch module 130 is not pressed. An orthogonal projection of the first bracket 110 on a plane P1 where the second bracket 120 is located is surrounded by the second bracket 120. Here, the plane P1 is parallel to the x-y plane. That is, for the first bracket 110, the first pivoting portions 111 are formed by winding a plurality of outer edges of the first bracket 110. The second bracket 120 is a hollow frame body, and the second pivoting portions 121 are formed by bending a plurality of inner edges of the hollow frame body. In addition, each of the linkage rods 140 has a first rod body 141 and at least one second rod body 142 extending from the first rod body 141, wherein the first rod body 141 is pivotally connected to the first pivoting portion 111, and the second rod body 142 is movably pivotally connected to the second pivoting portion 121. Here, the second rod body 142 extends from two opposite ends of the first rod body 141 and is bent to form a rectangular outline with a gap.

After the corresponding connection relationship between the linkage rods 140 and the first bracket 110 and the second bracket 120 are respectively established, the first bracket 110 may float up and down relative to the second bracket 120, i.e., the first bracket 110 moves along the z-axis. Here, the orthogonal projection of the first bracket 110 on the plane P1 where the second bracket 120 is located does not overlap the second bracket 120, so that the touch module 130 and the first bracket 110 approach each other in parallel with respect to the plane P1 where the second bracket 120 is located when the touch module 130 is pressed.

FIG. 3B is a cross-sectional view of a portion of the touch pad structure in FIG. 3A in another state. With reference to FIG. 3A and FIG. 3B at the same time, when the first bracket 110 and the touch module 130 on the first bracket 110 are pressed, the process from what is shown in FIG. 3A to what is shown in FIG. 3B is clearly illustrated. Namely, while the first bracket 110 and the touch module 130 thereon are moved toward the plane P1 where the second bracket 120 is located, the first bracket 110 remains in a state parallel to the x-y plane. For the second bracket 120, the first bracket 110 or the touch module 130 may be considered as moving toward the second bracket 120 at an equal distance; that is, the distance from the plane P1 to any region on the same plane (parallel to the x-y plane) on the first bracket 110 or to any pressed region on the same plane (parallel to the x-y plane) on the touch module 130 remains unchanged during said moving process.

It should also be mentioned that for the second bracket 120, each of the second pivoting portions 121 has a gap 121a facing away from the first bracket 110, the first rod body 141 of each of the linkage rods 140 is pivotally rotated at the first pivoting portion 111, while the second rod body 142 is simultaneously pivotally rotated and moved at the second pivoting portion 121, wherein the moving direction is parallel to the plane P1 where the second bracket 120 is located. As shown in FIG. 2B, when the touch module 130 is pressed, the gap 121a of the second pivoting portion 121 provides a margin for the second rod body 142 to move toward the positive y-axis direction, so that the first bracket 110 and the touch module 130 may smoothly descend along the z axis. Meanwhile, the support plate 161 provided in the embodiment has a plurality of hollow-carved portions 161a and a latching opening 161b, and the latching opening 161b corresponds to a latching portion 122 of the second bracket 120, so that the second bracket 120 may be smoothly assembled on the support plate 161. Each of the hollow-carved portions 161a is located at a moving path of the first pivoting portion 111 (and the first rod body 141) on the moving path, so that when the touch module 130 is pressed, the first pivoting portion 111 is partially moved into the hollow-carved portion 161a. That is, in addition to the moving path of the first rod body 141 and the first pivoting portions 111 along the z axis, the hollow-carved portions 161a of the support plate 161 may further provide the first pivoting portions 111 with a margin of movement along the z axis. On the other hand, with reference to FIG. 2 again, in the embodiment, the first pivoting portions 111 of the first bracket 110, the second pivoting portions 121 of the second bracket 120, and the linkage rods 140 are symmetrical with respect to the central axis L1, respectively. That is, as shown in FIG. 2, the first pivoting portions 111 are located at side edges of four outer edges of the first bracket 110, and the second pivoting portions 121 are located at side edges of four inner edges of the second bracket 120. Similarly, the linkage rods 140 are located between the first bracket 110 and the second bracket 120 and surround the four outer sides of the first bracket 110. Accordingly, the components constitute a mechanism that allows the first bracket 110 (and the touch module 130 thereon) to distribute stress and move stably.

Figure 3C:
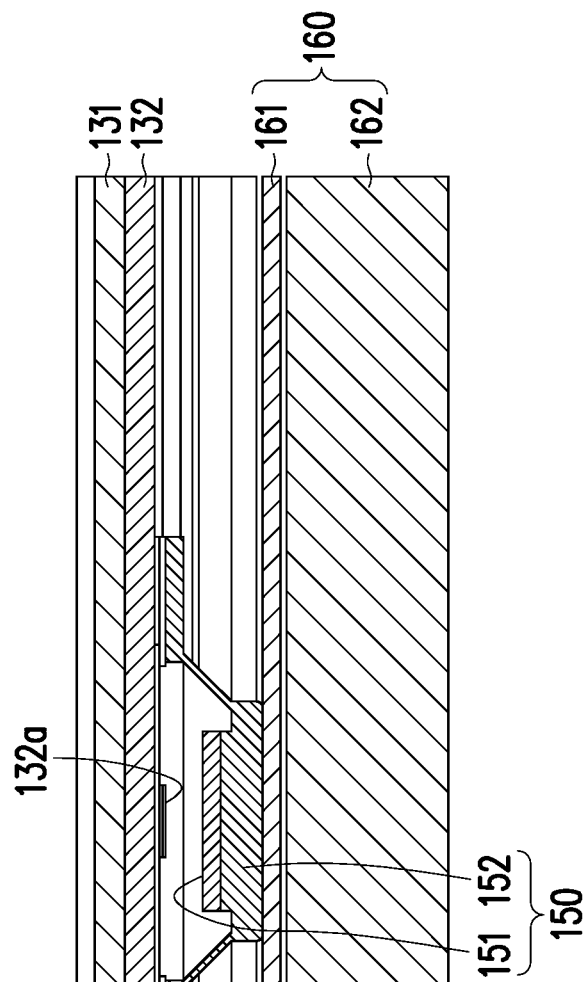
FIG. 3C is a cross-sectional view of a portion of the touch pad structure in FIG. 1 along a sectional line B-B.

FIG. 3C is a cross-sectional view of a portion of the touch pad structure in FIG. 1 along a sectional line B-B. With reference to FIG. 2 and FIG. 3C, in comparison with FIG. 3A and FIG. 3B, respectively, the touch pad structure 100 provided in the embodiment further includes a plurality of elastic members 150, each of which has a dome structure and is disposed between the support plate 161 and the touch module 130; thereby, when the touch module 130 is pressed, as shown in FIG. 3B, the first bracket 110 is moved toward the plane P1 where the second bracket 120 is located, and each of the elastic members 150 is deformed to accumulate an elastic force. Next, in the state shown in FIG. 3B, when the user releases the force required for pressing the touch module 130 (i.e., the touch module 130 is not pressed), the elastic forces of the elastic members 150 drive the first bracket 110 to move away from the plane P1 where the second bracket 120 is located, and the first bracket 110 and the touch module 130 are restored to the state shown in FIG. 3A.

In the embodiment, the touch module 130 includes a glass layer 131, a circuit board 132, and a bonding layer 133 which are stacked together. After the glass layer 131 and the circuit board 132 are completely assembled, the bonding layer 133 and the first bracket 110 are further assembled. Further, as shown in FIG. 3C, the circuit board 132 has a bonding pad 132a, and the elastic member 150 has a trigger portion 151. As such, when the touch module 130 is pressed, the trigger portion 151 abuts against and conducts electricity to the bonding pad 132a, thereby generating a trigger signal. In the embodiment, the five elastic members 150 with the same structure are arranged according to the look of the touch pad structure 100, and the number of elastic members 150 or their trigger positions may be adjusted in response to various requirements. On the other hand, for the touch pad module 100, the elastic member 150 at the center and the trigger mechanism (i.e., the bonding pad 132a and the trigger portion 151) are located at the same region, while the remaining four elastic members 150 are configured to provide overall balance to the mechanism and maintain the gap at the opening 171 of the upper cover 170 of the touch module 130.

To sum up, in the touch pad structure provided in one or more embodiments of the disclosure, the touch module is disposed on the first bracket, and the linkage rods are connected between the first bracket and the second bracket, so that one portion of each of the linkage rods connected to the first pivoting portion is pivotally rotated, and another portion of each of the linkage rods connected to the second pivoting portion is pivotally rotated and moved, whereby the first bracket may be moved toward the plane where the second bracket is located when the touch module is pressed. In other words, no matter which portion of the touch module is pressed by the user, the touch module and the first bracket may be smoothly moved relative to the second bracket in the above-mentioned manner due to the connection relationship of the linkage rods.

Furthermore, in the thickness direction of the touch pad structure (i.e., along the z axis provided in the previous embodiment), the first bracket and the second bracket are structurally connected merely by the linkage rods, so as to form the alternately arranged structure (the first bracket is on the inside while the second bracket is on the outside) with the same central axis. Therefore, the thickness of the touch pad structure and the electronic device applying the touch pad structure may be effectively reduced. Besides, the touch pad structure provided herein does not require the conventional scissor-switch mechanism and thus can comply with the requirement for slimness. Here, the slimness feature is not required by the touch pad structure itself but also by the body of the electronic device applying the touch pad structure.

It will be apparent to those skilled in the art that various modifications and variations can be made to the disclosed embodiment without departing from the scope or spirit of the disclosure. In view of the foregoing, it is intended that the disclosure covers modifications and variations provided that they fall within the scope of the following claims and their equivalents.

What is claimed is:

1. A touch pad structure, comprising:
a touch module;
a first bracket, having a plurality of first pivoting portions, the touch module being disposed on the first bracket;
a second bracket, having a plurality of second pivoting portions; and
a plurality of linkage rods, each of the linkage rods being pivotally connected between the first pivoting portion and the second pivoting portion, so that the touch module is moved together with the first bracket when the touch module is pressed, wherein one portion of each of the linkage rods is pivotally rotated at the first pivoting portion, another portion of each of the linkage rods is pivotally rotated and moved at the second pivoting portion, and the touch module and the first bracket are moved toward a plane where the second bracket is located.

2. The touch pad structure according to claim 1, wherein the first bracket and the second bracket form a stacked frame body with a same central axis, and an orthogonal projection of the first bracket on the plane where the second bracket is located is surrounded by the second bracket.

3. The touch pad structure according to claim 1, wherein the first pivoting portions are formed by winding a plurality of outer edges of the first bracket.

4. The touch pad structure according to claim 1, wherein the second bracket is a hollow frame body, and the second pivoting portions are formed by bending a plurality of inner edges of the hollow frame body.

5. The touch pad structure according to claim 4, each of the second pivoting portions has a gap facing away from the first bracket, and a moving direction of the another portion of the each of the linkage rods in the corresponding second pivoting portion is parallel to the plane where the second bracket is located.

6. The touch pad structure according to claim 1, wherein each of the linkage rods has a first rod body and at least one second rod body extending from the first rod body, the first rod body is pivotally connected to the first pivoting portion, and the second rod body is movably pivotally connected to the second pivoting portion.

7. The touch pad structure according to claim 1, further comprising a support plate, wherein the second bracket is disposed on the support plate, the support plate has a plurality of hollow-carved portions, each of the hollow-carved portions is located on a moving path of the first pivoting portions, so that one portion of the first pivoting portions is moved into the hollow-carved portion when the touch module is pressed.

8. The touch pad structure according to claim 7, further comprising a plurality of elastic members, each of the elastic members being disposed between the support plate and the touch module, wherein when the touch module is pressed, the first bracket is moved toward the plane where the second bracket is located, and each of the elastic members is deformed to accumulate an elastic force; when the touch module is not pressed, the elastic force of the elastic members drives the first bracket to move away from the plane where the second bracket is located, so as to restore the touch module.

9. The touch pad structure according to claim 1, where the first bracket floats up and down relative to the second bracket through the linkage rods, and an orthogonal projection of the first bracket on the plane where the second bracket is located does not overlap the second bracket, so that the touch module and the first bracket approach each other in parallel with respect to the plane where the second bracket is located when the touch module is pressed.

10. The touch pad structure according to claim 1, wherein the first bracket and the second bracket form a stacked frame body with a same central axis, and the first pivoting portions, the second pivoting portions, and the linkage rods are symmetrical with respect to the central axis.

* * * * *